United States Patent [19]

Tu

[11] Patent Number: 5,187,763
[45] Date of Patent: Feb. 16, 1993

[54] OPTICAL FIBER CABLE HAVING DRIPLESS, NON-BLEEDING AND OPTICAL FIBER COATING-COMPATIBLE WATERBLOCKING MATERIAL IN CORE THEREOF

[75] Inventor: Ching-Fang Tu, Tucker, Ga.

[73] Assignee: American Telephone & Telegraph Company, New York, N.Y.

[21] Appl. No.: 691,770

[22] Filed: Apr. 26, 1991

[51] Int. Cl.⁵ .................................................. G02B 6/44
[52] U.S. Cl. .................................... 385/100; 385/109; 385/113; 523/173
[58] Field of Search ........................ 385/100, 109, 113; 523/173

[56] References Cited

U.S. PATENT DOCUMENTS

| | | | |
|---|---|---|---|
| 4,497,538 | 2/1985 | Patel | 385/109 |
| 4,509,821 | 4/1985 | Stenger | 523/173 X |
| 4,701,016 | 10/1987 | Gartside, III et al. | 385/100 |
| 4,815,813 | 3/1989 | Arroyo et al. | 385/113 |
| 4,826,278 | 5/1989 | Gartside, III et al. | 385/105 |
| 4,839,970 | 6/1989 | Goetze et al. | 523/173 X |
| 4,870,117 | 9/1989 | Levy | 523/173 |
| 5,013,126 | 5/1991 | Hattori et al. | 523/173 X |

Primary Examiner—John D. Lee
Assistant Examiner—S. W. Barns

[57] ABSTRACT

An optical fiber cable (20) includes a core which (22) is filled with a filling material (26) comprising a composition of matter which passes industry wide drip tests, which substantially has no oil separation and which has excellent thermal oxidative stability. The filling composition includes a relatively high molecular weight aliphatic hydrocarbon which may be a polyalphaolefin, for example, or a relatively high molecular weight mineral oil. Also included in the composition of the filling material is a fumed silica, a block copolymer and a relatively high amount of an antioxidant system. Swelling of coating materials for optical fibers (25,25) which are relatively soft and which are in contact with the filling material is substantially less than that experienced with prior art filling materials. Because of the inclusion of a low pour point aliphatic hydrocarbon in the filling material, the cable provides excellent optical performance at low temperatures.

18 Claims, 5 Drawing Sheets

OPTICAL FIBER CABLE HAVING DRIPLESS, NON-BLEEDING AND OPTICAL FIBER COATING-COMPATIBLE WATERBLOCKING MATERIAL IN CORE THEREOF

TECHNICAL FIELD

This invention relates to an optical fiber cable having a dripless, non-bleeding and optical fiber coating-compatible waterblocking material in a core thereof. More particularly, this invention relates to an optical fiber cable having a core in which a composition of matter which is grease-like fills interstices in the core.

BACKGROUND OF THE INVENTION

In the cable industry, it is well known that changes in ambient conditions lead to differences in water vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High levels of condensed moisture inside a cable sheath system may have a detrimental effect on the transmission characteristics of a metallic conductor cable.

Furthermore, water may enter the cable because of damage to the cable which compromises its integrity. For example, rodent attacks or mechanical impacts may cause openings in the sheath system of the cable to occur, allowing water to enter, and, if not controlled, to move longitudinally along the cable into splice closures.

Optical fiber cables have made great inroads into the communications cable market. Although the presence of water itself within an optical fiber cable is not necessarily detrimental to its performance, passage of the water along the cable interior to connection points or terminals or associated equipment inside closures, for example, may cause problems especially in freezing environments and should be prevented.

Consequently, it should be no surprise that cables for transmitting communications signals must meet industry standards with respect to waterblocking provisions. For example, one industry standard requires that there be no transmission of water under a pressure head of one meter in one hour through a one meter length of cable.

In the prior art, various techniques have been used to prevent the ingress of water through the sheath system of a cable and along the core. For example, a metallic shield which often times is used to protect a metallic conductor cable against lightning and rodent attacks is provided with a sealed longitudinal seam. However, the forming of a shield about a cable core requires the use of relatively low manufacturing line speeds. Also, the use of a metallic shield is destructive of the otherwise all-dielectric property of an optical fiber cable. Further, lightning strikes may cause holes in a metallic shield.

It is not uncommon to include provisions in addition to or as an alternative to a metallic shield for preventing the ingress of water into the core. Waterblocking materials have been used to fill cable cores and to coat portions of cable sheath systems to prevent the movement longitudinally thereof of any water which enters the cable. Although the use of such a material, which typically is referred to as a filling material and which typically is in the form of a grease-like composition of matter, causes housekeeping problems for field personnel during splicing operations, for example, it continues to be used to prevent entry of the water into the core. In optical fiber cables, a further important function of a filling material is the maintenance of the optical fibers in a low stress state.

A grease-like composition of matter typically is a semisolid or semiliquid substance comprising a thickening or gelling agent in a liquid carrier. The gelling agents used in greases frequently are fatty acid soaps, but high melting point materials, such as clays, silica, organic dyes, aromatic amides, and urea derivatives also are used. Nonsoap thickeners are typically present as relatively isometric colloidal particles. All types of gelling agents form a network structure in which the carrier is held by capillary forces.

When a low stress is applied to a grease-like material, the material acts substantially as a solid. If the stress is above a critical value, then the material flows and the viscosity decreases rapidly. The decrease in viscosity is largely reversible because it is typically caused by the rupture of network junctions between the filler particles, and these junctions can reform following the release of the critical stress.

A cable filling material, especially an optical fiber cable filling material, should meet a variety of requirements. Among them is the requirement that the physical properties of the cable remain within acceptable limits over a rather wide temperature range e.g., from about $-40°$ to about $76°$ C. It is desirable that the composition of matter of the filling material be substantially free of syneresis, i.e. have an ability to retain uniform consistency, over the temperature range. Generally, syneresis is controlled by assuring dispersion of an adequate amount of collodial particles or other gelling agent. Other desirable properties of grease-like compositions include thermal oxidation resistance.

Further complicating the optical fiber cable situation is the introduction of a waterblocking filling material into the cable core in order to prevent the incursion of water. Suitable waterblocking materials in use must yield under strains experienced when the cable is made or handled. Otherwise, movement of the optical fibers within the cable would be prevented and the fibers would buckle because they contact, with a relative small periodicity, a surface of the unyielding filling material. The smaller the periodicity of the fibers when contacting such an unyielding surface, the greater a loss which is referred to as microbending loss.

Typically, microbending loss in optical fiber cables is more difficult to control at long wavelengths than at short ones. Thus the requirements on the mechanical properties of a fiber cable filling material are typically substantially more severe for cable that is to be used at 1.55 $\mu$m, for example, than they are if the cable is to be used at shorter operating wavelengths of 1.3 $\mu$m, for example. Although, it has been found that some prior art filling materials perform quite satisfactorily at wavelengths up to about 1.3 $\mu$m, it has also been found that this is often not the case at longer wavelengths.

Because silica-based optical fibers typically have their lowest losses at or near the 1.55 $\mu$m wavelength, there is great interest in operating optical fiber telecommunication systems at approximately that wavelength. Thus, it is important to have available optical fiber cable that has no significant cabling-induced losses at long wavelengths, including about 1.55 $\mu$m.

Filling compositions for use in optical fiber cables should have a relatively low shear modulus, $G_e$. However, it has been determined that, at least for some applications, a low value of $G_e$ of the filling material is not sufficient to assure low cabling loss, and that a further parameter, the critical yield stress, $\sigma_c$, needs to be controlled because it also affects the optical performance of fibers in a cable filled with a grease-like composition of matter.

A grease-like filling composition of matter having a relatively low critical yield stress is disclosed in U.S. Pat. No. 4,701,016 which issued on Oct. 20, 1987 in the names of C. H. Gartside, III, et al. and which is incorporated by reference hereinto. The composition comprises oil, a gelling agent such as colloidal particles, and, optionally, a bleed inhibitor. It includes 93% by weight mineral oil and 7% by weight of hydrophobic formed silica. Among oils useful in the practice of the invention are ASTM type (ASTM D-226 test) 103, 104A, or 104B (or mixtures thereof) naphthenic oils having a minimum specific gravity of about 0.860 and a maximum pour point (ASTM D97) of less than approximately $-4°$ C., and polybutene oils of minimum specific gravity of about 0.83 and a maximum pour point (ASTM D97) of less than about 18° C. The colloidal particle filler material preferably comprises silica particles. Preferred bleed inhibitors are styrene-rubber or styrene-rubber-styrene block copolymers, and/or semiliquid rubbers, such as a high viscosity polyisobutylene. Other ingredients, such as, for example, a thermal oxidative stabilizer, may be present. The critical yield stress of the filling material of U.S. Pat. No. 4,701,016 is not greater than about 70 Pa, measured at 20° C. whereas the shear modulus is less than about 13 kPa at 20° C.

Incorporating a block copolymer into the grease-like composition of matter allows a reduction of the amount of colloidal particles that has been to added to the mixture to prevent syneresis of the gel. This reduction can result in cost savings. Furthermore, it makes possible the formulation of less bleeding compositions having a very low critical yield stress.

Waterproofing filling materials for use in cables also must pass industry standard drip tests. To pass these tests, filling materials in cable cores must be retained as cable samples, suspended vertically, are subjected to specified elevated temperatures. Some prior art materials, which have been used, perform satisfactorily with respect to microbending and associated losses, but they bleed out excessively and have problems in meeting current drip tests. Also, it is desired that the low means added losses exhibited by some prior art filling materials at least be met by filling materials which pass the drip test and have suitable low temperature properties.

Oil separation is a property of a grease-like material which describes the tendency to bleed oil during its lifetime. What is desired is a filling material which has an oil separation no greater than 30% when centrifuged at 10,000 rpm for one hour.

Because cable drip is related to oil separation, constraints on the sought after filling material include oil separation, critical yield stress and viscosity. The viscosity of the sought after filling material also is important with respect to processing. These constraints usually are antagonistic to each other. For example, a reduction of oil separation and an increase in cable drip temperature require high viscosity and yield stress whereas to facilitate processing and to reduce optical loss requires low viscosity and yield stress.

Another problem relating to filled optical fiber cables is the compatibility of the filling material with some coating materials which are disposed about drawn optical fiber to protect the optical fiber. If compatibility is lacking, the performance and/or the appearance of the optical fiber could be affected adversely. The compatibility of otherwise suitable prior art filling materials with some coating materials, particularly those which are relatively soft, is something less than desired.

Although some prior art compositions of matter are suitable for filling cable cores comprising optical fibers each having layers of particular coating materials thereon, the prior art does not appear to include a cable filling material which is suitable for filling cable cores which include optical fiber coated with some of the softer coating materials used today. What is sought after and what does not appear to be disclosed in the prior art is an optical fiber cable filling composition of matter which is compatible with a broad range of optical fiber coating materials, which does not bleed and which does not drip from the cable core at specified elevated temperatures and one which does not exacerbate optical loss.

SUMMARY OF THE INVENTION

The foregoing problems of the prior art have been solved by a cable of this invention having a filling composition of matter disposed in a core thereof. A cable of this invention includes a core comprising a plurality of coated optical fibers and a filling composition of matter which is disposed about the fibers. Typically, the fibers and the filling material are disposed within a tubular member which is disposed within a sheath system. The sheath system includes longitudinally extending strength members and a plastic jacket.

The filling composition of matter comprises at least about 85 percent by weight of an oil constituent which is a relatively high molecular weight aliphatic hydrocarbon, the molecular weight of which is at least about 600. The aliphatic hydrocarbon constituent may be a synthetic oil such as polyalphaolefin, for example, or a relatively high molecular weight mineral oil. Relatively low pour point oils are used in order to improve optical loss at low temperatures. A thickening system which includes an inorganic constituent and a block copolymer is used to reduce the viscosity of the filling material as well as to reduce oil separation. Also a relatively large percent by weight of an antioxidant system is used to prevent thermal oxidative degradation of the filling material as well as of materials in contact with the filling material.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figures 1, 2:
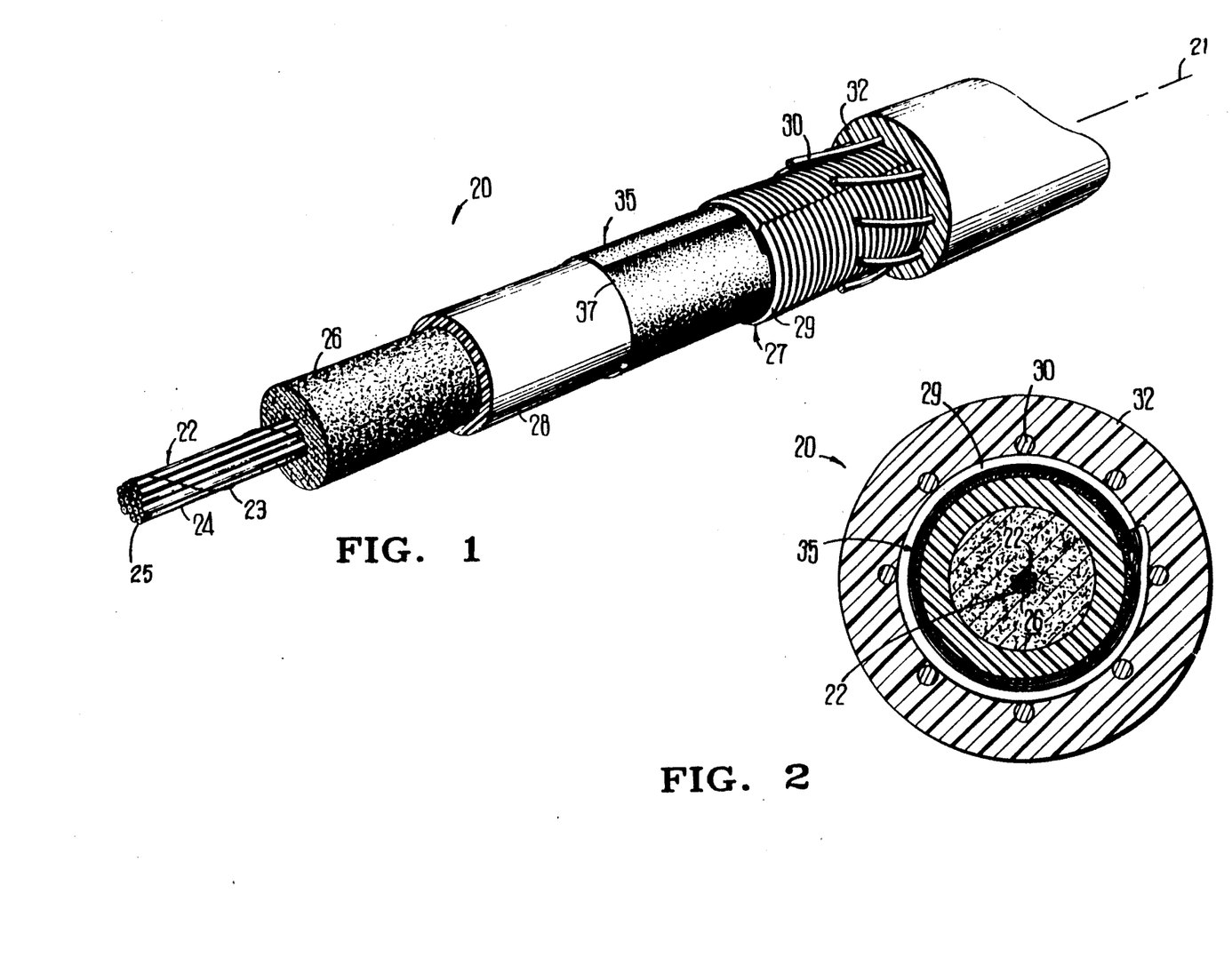
FIG. 1 is a perspective view of an optical fiber cable of this invention which has a core in which is disposed a filling material.
FIG. 2 is an end view in section of the cable of FIG. 1.

Referring now to FIGS. 1 and 2, there is shown a communications cable which is designated generally by the numeral 20 and which has a longitudinal axis 21. It includes a core 22 comprising optical fibers 25—25 which may be arranged in one or more units 24—24. Each of the optical fibers is provided with a protective coating system which typically includes an inner primary coating layer and an outer secondary coating layer. Also, each of the coated fibers may be buffered with an outer layer of polyvinyl chloride (PVC), for example. Each of the units 24—24 may be wrapped with a binder ribbon 23. The core 22 includes a waterblocking material 26 which is disposed within a tubular member 28 of a sheath system 27. The tubular member 28 often is referred to as a core tube.

The tubular member 28 may be enclosed by a metallic shield 29 and an outer plastic jacket 32. The sheath system 27 also may include strength members 30—30. Also, a waterblocking tape 35 may be wrapped about an outer surface of the core tube 28. The tape 35 may be a waterblocking tape which is disclosed, for example, in U.S. Pat. No. 4,867,526 which issued on Sep. 19, 1989 in the name of C. J. Arroyo. Also, the filling material 26 may be used to fill the core of a cable which includes optical fiber ribbons such as those disclosed in U.S. Pat. No. 4,900,176 which issued on Feb. 13, 1990 in the names of K. W. Jackson, et al.

Constraints on the sought after filling material which includes an oil constitutent include oil separation, and associated cable drip temperature, critical yield stress and viscosity of the filling material. As mentioned hereinbefore, these constraints usually are antagonistic to each other. Priorly, it has been demonstrated that low pour point oils produce filling materials the critical yield stress of which at low temperatures decreases with decreasing pour point. The pour point of a material is the lowest temperature at which a sample of the material may be poured. Theoretically, the use of a low pour point oil is conductive to the reduction of optical loss at low temperatures. Cable construction and cable processing conditions also affect the optical performance of fibers and, therefore, the benefit of a low pour point oil may become obscured.

The critical yield stress of a filling material is considered to affect the optical performance of fibers in a cable filled with the filling material. The prior art filling material typically has a critical yield stress of 0.0016 psi at room temperature and 0.0096 psi at −40° C. The critical yield stress of the filling materisl 26 should be such that it does not cause an increase in optical fiber loss over that of prior art filling materials at all temperatures.

The viscosity requirement is needed to accommodate processing, not cable performance. The viscosity of prior art filling material as measured by a helipath viscometer should be 15 to 45 units using spindle TB at room temperature. In order to assure the waterhead resistance of an optical fiber cable, it is preferred to have the helipath viscosity in excess of 20 units. It is desired that the viscosity of the filling material be in the vicinity of that of prior art filling materials so that presently available processing facilities can be used.

The composition of matter of the filling material 26 which is used to fill interstices in the core of the cable 20 and which meets the foregoing requirements includes an oil constituent system in the range of about 85 to about 92 percent by weight. A suitable oil constituent is a relatively high molecular weight aliphatic hydrocarbon. By relatively high in this description is meant a molecular weight at least about 600.

The aliphatic hydrocarbon constituent may be a relatively high molecular weight mineral oil such as Sunpar 2280 available from the Sun Refining and Marketing Co., or Tufflo 80 mineral oil available from the Shell Chemical Company, for example. In the alternative, the aliphatic hydrocarbon constituent may be a synthetic oil such as, polyalphaolefin oil, polypropene oil or polybutene oil for example. Mixtures of polyalphaolefin with mineral oils and polybutene oils also may be used. In a preferred embodiment, the composition includes about 87% by weight of a polyalphaolefin such as HITEC 174 oil available from the Ethyl Corporation or SHF 401 oil available from the Mobil Corporation. The synthetic oil of the preferred embodiment is a hydrogenated oligomer of alpha-decene and has an average molecular weight of 1280. The viscosity of the oil at 100° C. is approximately 40 centistokes. It has a pour point of less than −34° C.

The polyalphaolefin aliphatic hydrocarbon also may be one which is characterized by a viscosity in the range of about 10 centistokes at 100° C. Suitable polybutene oils have a viscosity in the range of 190 to 300 centistokes whereas a suitable mineral oil has a viscosity greater than 150 SUS which equates to about 35 centistokes. If it has a viscosity substantially greater than 10 centistokes, such as, for example, 40 centistokes, the filling material may become more compatible with the coated optical fiber. Also, if the viscosity is less than about 10, for example 8, the percent swelling of the primary coating material on the optical fiber may increase to about 42% which exceeds the presently allowable 40%.

The oil constituent needs to be thickened so that it will not run out of a cable and so that oil separation is reduced. Oil separation or syneresis is a property of a grease-like filling material which describes the tendency to bleed oil during the lifetime of the filling material. One prior art filling material is known to separate oil if left undisturbed for a certain period of time. The syneresis is usually a slow process and, therefor, has to be determined by an accelerated method, centrifugation. As mentioned hereinbefore, it is desired that the filling material 26 be characterized by a 30% maximum oil separation when centrifuged at 10,000 rpm (approximately 12000 G) for one hour. In order to accomplish this, inorganic and organic thickening agents are included in the composition of the filling material.

Colloidal fillers are used as inorganic thickening agents to adjust the yield stress of the composition. Colloidal filler particles in oil gel the oil by bonding surface hydroxyl groups to form a network. Such gels are capable of supporting a load below a critical value of stress. Above this stress level, the network is disrupted, and the material assumes a liquid-like character and flows under stress. Such behavior often is referred to as thixotropic and is desirable to facilitate processing.

Colloidal fillers useful in the cable 20 include colloidal silica, either hydrophilic or hydrophobic, preferably a hydrophobic fumed silica having a BET surface area between about 50 and about 400 m²/gm. The higher the surface area, the lower the oil separation. An increase in the fumed silica level decreases oil separation, but adversely increases the critical yield stress and the viscosity of the grease. An example of a hydrophobic fumed silica is a polydimethylsiloxane-coated fumed silica having a BET surface area of about 80–120 m²/gm, containing about 5% b.w. carbon, and being available from the Cabot Corporation of Tuscola, Ill. under the trade designation Cab-O-Sil TS720. An exemplary hydrophilic colloidal material is fumed silica with a BET surface area of about 175–225 m²/gm, nominal particle size of 0.012 μm, and a specific gravity of 2.2, available from the Cabot Corporation under the designation Cab-O-Sil M-5. Other colloidal fillers that may be useful in the practice of the invention are precipitated silicas and clays such as bentonites, with or without surface treatment. In the preferred embodiment, a hydrophobic fumed silica such as the Cab-O-Sil TS720 fumed silica in the amount of about 5 to 8 percent by weight is used as the inorganic thickening agent.

Oil retention of the filling material 26 may be improved by the addition of one of more organic thickening agents or bleed inhibitors to the composition. Copolymers used as bleed inhibitors are known to reduce the oil separation of a grease-like filling material, and, unlike fumed silica, does not contribute as much to increasing yield stress and viscosity.

The bleed inhibitor may be a block copolymer, a relatively high viscosity semiliquid, sometimes referred to as semisolid, rubber, or other appropriate rubber. Block copolymers and semiliquid rubbers may be referred to collectively as rubber polymers. Incorporating a rubber polymer into the grease-like composition of matter allows a reduction in the amount of colloidal particles that must be added to the mixture to prevent syneresis of the gel and can result in cost savings. Furthermore, it makes possible the formulation of non-bleeding compositions having a relatively low critical yield stress.

Among the block copolymers that can be used in waterblocking compositions for the cable of the invention are styrene/rubber and styrene-rubber-styrene block copolymers having a styrene/rubber ratio between approximately 0.1 and 0.8 and a molecular weight, as indicated by viscosity in toluene at 25° C., of from about 100 cps in a 20% b.w. rubber solution to about 2000 cps in a 15% b.w. rubber solution. Exemplary block copolymers are (a) a styrene-ethylene propylene block copolymer (SEP), unplasticized, having a styrene/rubber ratio of about 0.59, a specific gravity of about 0.93, a break strength per ASTM D-412 of 300 psi, and being available from the Shell Chemical Company of Houston, Tex., under the trade designation Kraton G1701; (b) a styrene-ethylene propylene block copolymer having a sytrene to rubber ratio of about 0.39 and available from the Shell Chemical Company under the designation G1702; (c) styrene-ethylene butylene-styrene block copolymer (SEBS), unplasticized, and having a styrene/rubber ratio of about 0.16, a specific gravity of about 0.90, 750% elongation, 300% modulus per ASTM D-412 of 350 psi, and being available from the Shell Chemical Corporation under the trade designation Kraton G1657 and (d) a diblock copolymer of ethylene and propylene (EP) available from the Shell Chemical Company under the designation G1750. Another copolymer which may be used is Kraton 1726 copolymer which is a mixture of 30% styrene-ethylene butylene-styrene triblock copolymer (SEBS) and 70% styrene-ethylene butylene diblock copolymer (SEB). The preferred embodiment includes Kraton G 1701 block copolymer.

Also included in the composition of the filling material 26 is an antioxidant system in the amount of about 1–2% by weight. The antioxidant constituents are high molecular weight, hindered phenolic antioxidants which are relatively soluble in mineral oil. An acceptable antioxidant is one available from the Ciba-Geigy Company under the trade designation Irganox 1035. In a preferred embodiment, the filling composition includes 0.3% by weight of Irganox 1035 antioxidant and 1.7% by weight of Irganox 1076 antioxidant, the latter constituent being used to prevent the antioxidant from settling out. The solubility of Irganox 1035 antioxidant in mineral oil is about 0.30 g/100 ml and that of Irganox 1076 is 12 g/100 ml at 22° C. Another suitable non-precipitating antioxidant is Irganox 1520 high molecular weight liquid antioxidant, also available from the Ciba Geigy Company.

Exemplary compositions of this invention are shown in TABLES I, II, III, IV, and V, with the constituents being given in percent by weight. A summary of properties also is presented in each TABLE. Included in the TABLES are measurements of the swell of the primary optical fiber coating material, viscosity, oil separation and yield stress at room temperature. Cable drip test results at 65° C. are also provided in some of the TABLES.

In TABLE I, the composition example designated (F) meets all the desired properties. The yield stress is higher than that of a presently used filling material but is acceptable based on loss results in a cable having such a filling material. Cables filled with this composition of matter passed the drip test at 70° C.

TABLE I

| | FILLING MATERIAL BASED ON POLYALPHAOLEFIN OILS | | | | | | | | | | | | | |
|---|---|---|---|---|---|---|---|---|---|---|---|---|---|---|
| | Composition (% by wt) | | | | | | | | | Primary | | | | Drip |
| | Synthetic Oil | | Fumed Silica | | Copolymer | | | Antioxidant | | Coat | Hel. | Oil | Yield | Test |
| Ex. (1) | Hitec 174 (2) | Hitec 170 (3) | Aerosil R974 (4) | Cab-O-Sil TS720 (5) | Kraton G1701 (6) | Kraton G1702 (7) | Kraton G1750 (8) | Irganox 1035 (9) | Irganox 1076 (10) | Swell (Vol. %) (11) | Visc. (Units) (12) | Sep. (%) (13) | Stress (psi) (14) | at 65° C. (15) |
| A | 92 | | 8 | | | | | | | 5.0 | B24.3 | 13.6 | — | Fail |
| B | 89 | | 7 | | 3 | | | | 1 | — | B53.3 | 3.1 | 0.0045 | Pass |
| C | 88 | | 7 | | 4 | | | | 1 | — | B64.3 | 5.8 | — | Pass |
| D | 87 | | 6 | | 6 | | | | 1 | — | B39.4 | 1.3 | 0.0030 | Pass |
| E | 87 | | 6 | | 6 | | | 1 | | — | B43.3 | 1.2 | 0.0030 | Pass |
| F | 86 | | 6 | | 6 | | | | 2 | — | B39.4 | — | 0.0033 | Pass |
| G | 86.5 | | 6 | | 5.5 | | | | 2 | — | B34.1 | — | 0.0033 | Pass |
| H | 86.4 | | | 5.6 | 6.0 | | | | 2 | — | B30.9 | — | — | Pass |

TABLE I-continued

FILLING MATERIAL BASED ON POLYALPHAOLEFIN OILS

| | Composition (% by wt) | | | | | | | | | Primary | | | | Drip |
|---|---|---|---|---|---|---|---|---|---|---|---|---|---|---|
| | Synthetic Oil | | Fumed Silica | | Copolymer | | | Antioxidant | | Coat | Hel. | Oil | Yield | Test |
| Ex. (1) | Hitec 174 (2) | Hitec 170 (3) | Aerosil R974 (4) | Cab-O-Sil TS720 (5) | Kraton G1701 (6) | Kraton G1702 (7) | Kraton G1750 (8) | Irganox 1035 (9) | Irganox 1076 (10) | Swell (Vol. %) (11) | Visc. (Units) (12) | Sep. (%) (13) | Stress (psi) (14) | at 65° C. (15) |
| I | 89 | | 6 | | 4 | | | 1 | | — | B42.2 | 1.58 | 0.0030 | Pass |
| J | 88 | | 6 | | | 5 | | 1 | | — | B53.1 | 0.00 | 0.0040 | Pass |
| K | 87 | | 6 | | | | 6 | 1 | | — | B56.4 | 2.28 | 0.0030 | — |
| L | | 87 | 7.6 | | 3.4 | | | 0.3 | 1.7 | 36 | B29.5 | 7.02 | 0.0035 | — |
| M | | 84.8 | 7.6 | | 5.6 | | | 0.3 | 1.7 | — | B51.2 | 0.00 | 0.006 | Pass |
| N | | 85.5 | 8.0 | | 4.5 | | | 0.3 | 1.7 | — | B48.7 | 0.15 | 0.005 | Pass |
| O | | 85.5 | 6.5 | | 6 | | | 0.3 | 1.7 | — | B39.7 | 0.00 | 0.0032 | Pass |
| P | | 87 | 6.5 | | 4.5 | | | 0.3 | 1.7 | — | B23.1 | 0.00 | 0.0033 | Pass |

TABLE II

FILLING MATERIAL BASED ON POLYPROPENE OIL

| | Composition (% by wt) | | | Primary | Helipath | Oil | Drip |
|---|---|---|---|---|---|---|---|
| | Polypropene Oil | | Fumed Silica | Coat Swell | Viscosity | Separation | Test |
| Example (1) | Amoco 9013 (2) | Amoco 9015 (3) | Aerosil R974 (4) | (Vol %) (5) | (Units) (6) | (%) (7) | at 65° C. (8) |
| Q | 90 | | 10 | 46.8 | C55.1 | 0.00 | Pass |
| R | | 92 | 8 | 34.3 | C46.7 | 0.00 | Pass |

TABLE III

FILLING MATERIAL BASED ON POLYBUTENE OIL

| | Composition (% by wt) | | | | Primary | Helipath | Oil | Drip |
|---|---|---|---|---|---|---|---|---|
| | Polybutene Oil | | Fumed Silica | Copolymer | Coat Swell | Viscosity | Separation | Test |
| Example (1) | Indopol H100 (2) | Indopol H300 (3) | Aerosil R974 (4) | Kraton G1701 (5) | (Vol %) (6) | (Units) (7) | (%) (8) | at 65° C. (9) |
| S | 94 | | 6 | — | | B37.5 | 0.00 | — |
| T | 90 | | 10 | | 40.4 | C54.5 | 0.00 | Pass |
| U | | 94 | 6 | | 15.6 | B70.3 | 0.00 | Fail |
| V | | 92 | 8 | — | | C60.7 | 0.00 | Pass |
| W | | 90 | 10 | — | | D43.0 | 0.00 | Pass |
| X | | 90 | 5 | 5 | | C69.5 | 0.00 | — |

TABLE IV

FILLING MATERIAL BASED ON MINERAL OIL

| | Composition (% by wt) | | | | | | Primary | | | | Drip |
|---|---|---|---|---|---|---|---|---|---|---|---|
| | Mineral Oil | | Fumed Silica | | Copolymer | Antioxidant | Coat | Hel. | Oil | Yield | Test |
| Ex. (1) | Drakeol 35 (2) | Sunpar 2280 (3) | Aerosil R974 (4) | Cab-O-Sil TS720 (5) | Kraton G1701 (6) | Irganox 1035 (7) | Swell (Vol. %) (8) | Visc. (Units) (9) | Sep. (%) (10) | Stress (psi) (11) | at 65° C. (12) |
| Y | 93 | | | 7 | | 0.1 | 76.2 | B30.0 | 62.5 | 0.0016 | Fail |
| Z | 90 | | 10 | | | | — | C60.0 | 33.7 | — | Fail |
| AA | 87 | | 7 | | 5 | 1.0 | — | B39.3 | 0.0 | 0.0010 | Pass |
| BB | 87 | | | 7 | 5 | 1.0 | — | B69.0 | — | 0.0055 | Pass |
| CC | | 90 | 10 | — | — | — | 36.5 | B45.3 | 0.00 | — | — |
| DD | | 88 | 12 | — | — | — | — | C70.7 | 1.18 | — | Fail |
| EE | | 90 | | 6 | 3 | 1.0 | — | B60.9 | 0.31 | 0.005 | — |
| FF | | 89 | — | 4 | 3 | 1.0 | — | B23.8 | — | 0.001 | — |

TABLE V

FILLING MATERIAL BASED ON MIXTURES OF SYNTHETIC OIL AND MINERAL OIL

| Example | HITEC or Ethylflo 170 Synthetic Oil | Sunpar 2280 Mineral Oil | Indopol H100 Mineral Oil | Cab-O-Sil TS720 Fumed Silica | Kraton G1701 Copolymer | Irganox 1035 Antioxidant | Helipath Viscosity (Units) | Oil Separation (%) | Yield Stress (psi) |
|---|---|---|---|---|---|---|---|---|---|
| GG | 45 | 45 | — | 6 | 3 | 1 | B33.8 | 2.34 | 0.003 |
| HH | 44.5 | | 44.5 | 6 | 4 | 1 | B42.9 | 0.00 | 0.003 |

The test results indicate that high molecular weight oils are required to prevent some presently used optical fiber coatings from swelling. The higher the molecular weight of the mineral oil, the higher the pour point. Test results have shown that a low viscosity polyalphaolefin oil swelled the primary coating 36% but that a high viscosity polyalphaolefin oil, such as HITEC 174, for example, only swelled the optical fiber primary coating material approximately 5%. At approximately the same molecular weight, polyalphaolefin oil has a lower viscosity than other oils and thus filling materials made from these oils have a lower viscosity than filling materials made from other oils.

Figure 3:
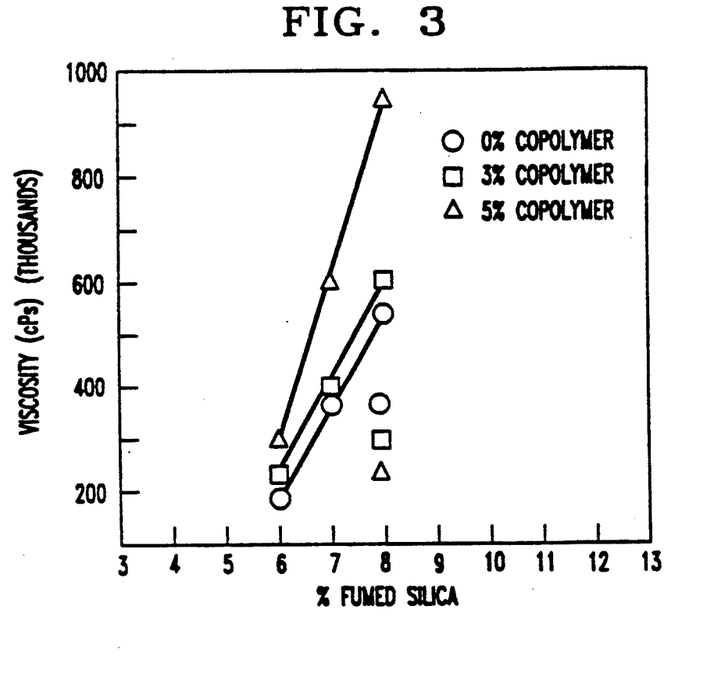
FIGS. 3 and 4 are graphs which depict the effects of a fumed silica and a copolymer constituent on the viscosity of the filling material.
Figure 4:
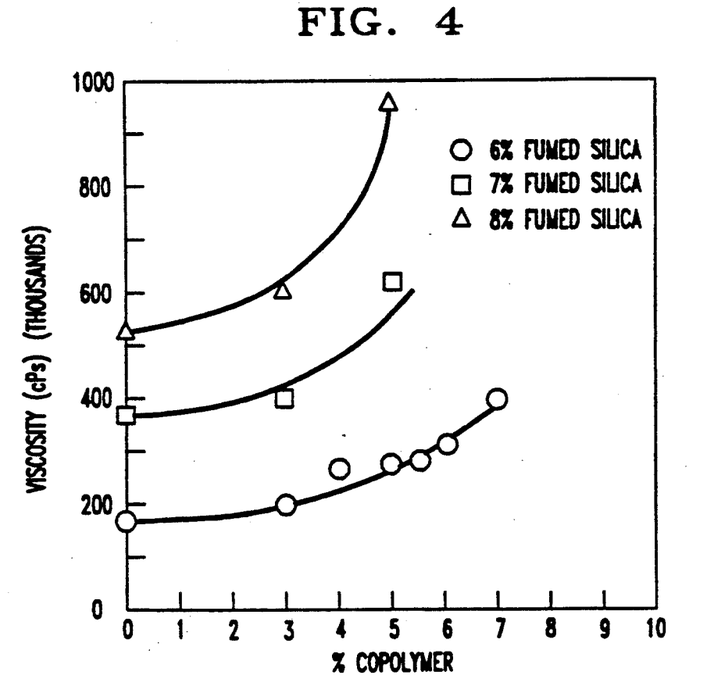

FIGS. 3 and 4 show the effect of Cab-O-Sil TS720 fumed silica and Kraton G1701 copolymer, respectively, on the viscosity of filling materials made with HITEC 174 oil. As can be seen, the effect of the fumed silica is pronounced when it is more than 5% by weight, while the effect of the copolymer becomes more pronounced if it contains more than 3%.

Figure 5:
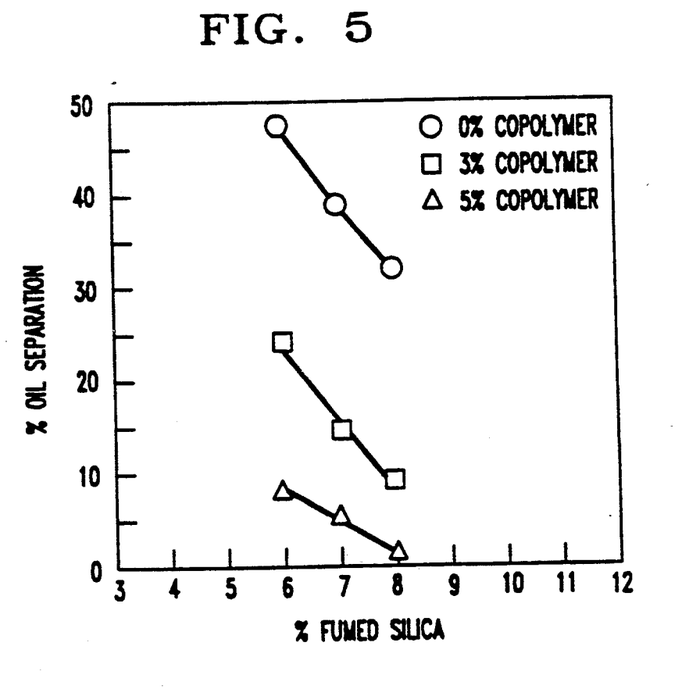
FIGS. 5 and 6 are graphs which depict the effect of a fumed silica and a copolymer constituent on oil separation of the filling material.
Figure 6:
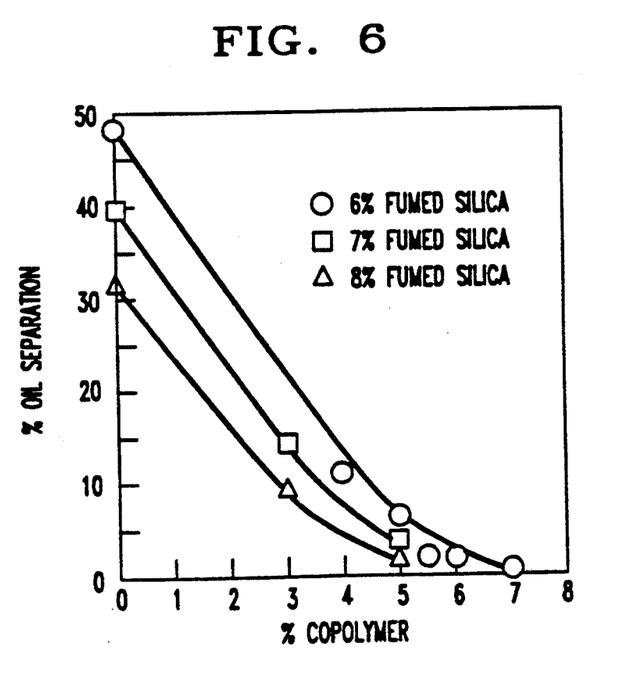

For a filling material which includes HITEC 174 polyalphaolefin oil, fumed silica does not reduce the oil separation without an adverse increase in viscosity and critical yield stress. A block copolymer was added to reduce further the oil separation and also to mitigate the viscosity increase. Unlike fumed silica, the block copolymer does not contribute as much as fumed silica in increasing yield stress and viscosity. The effects of Cab-O-Sil TS720 fumed silica and Kraton G1701 copolymer on the oil separation of filling materials are shown in FIGS. 5 and 6 respectively. Without the copolymer, the fumed silica is not effective in reducing oil separation. Also, without the fumed silica, the filling material even with high levels of the block copolymer tends to flow. Therefore, the fumed silica and the block copolymer should be used together and their ratio optimized.

Advantageously, the filling material 26 which is used to fill the core of a cable of this invention yields at a low enough stress so that the optical fibers 25—25 and units 24—24 are capable of moving within the core when the cabale is loaded or bent. The yielding filling material allows the optical fibers to move within the tubular member 28 which reduces the stress therein and lengthens the life of the optical fibers.

Figure 7:
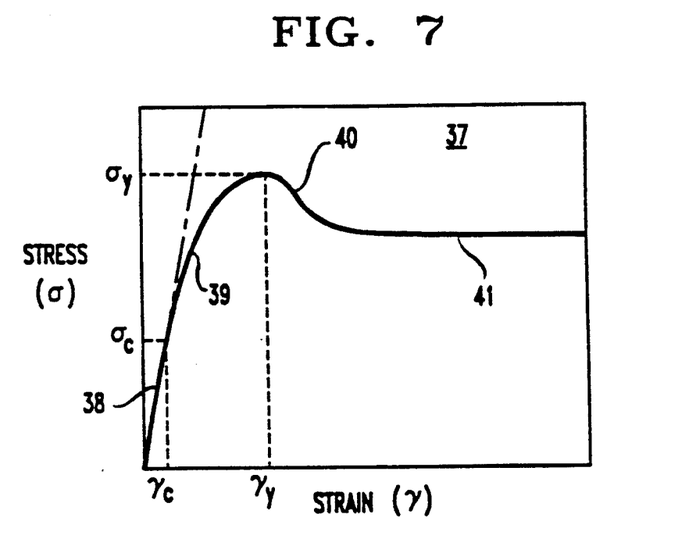
FIG. 7 depicts a generalized stress-strain curve of a filling material.

FIG. 7 shows a generalized stress-strain curve 37 at constant strain rate for a thixotropic material such as that used as the waterblocking material 26, and identifies several important parameters. Along a segment 38 of the stress-strain curve 37, the material acts essentially as an elastic solid. The segment extends from zero stress to the critical yield stress $\sigma_c$. The strain corresponding to $\sigma_c$ is identified as $\gamma_c$, the critical shear strain. By definition, the coordinates $\sigma_c$ and $\gamma_c$ indicate the onset of yielding and the quantity $\sigma_c/\gamma_c$ (or $d\sigma/d\gamma$ for $\gamma < \gamma_c$) is known as the shear modulus, $G_e$, of the material.

A segment 39 of the stress-strain curve of FIG. 7 represents increasing values of incremental strain for increasing stress. The stress $\sigma_y$ is the maximum value of stress sustainable by the material at a given strain rate with $\gamma_y$ being the corresponding strain. For strains in excess of $\sigma_y$, the stress at first decreases as shown by a segment 40, becoming substantially independent of strain for still greater values of strain as shown by a segment 41. The waterblocking material thus exhibits a liquid-like behavior for $\sigma > \sigma_y$.

Figure 8:
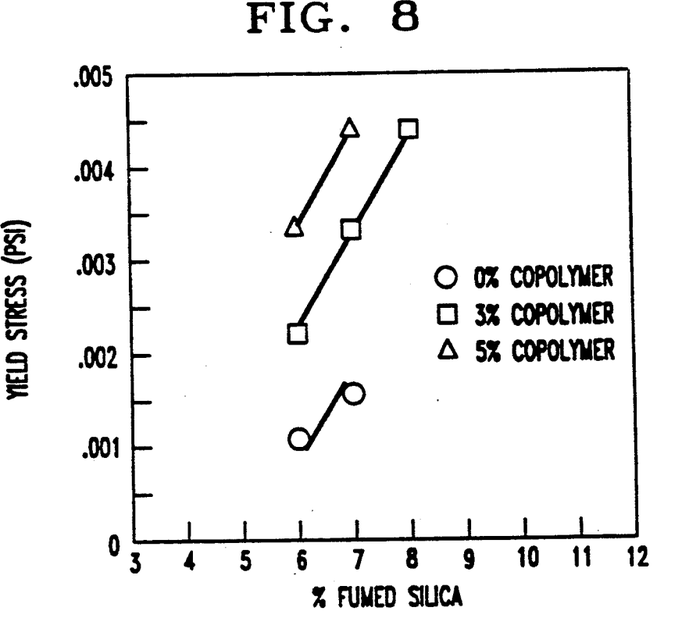
FIGS. 8 and 9 are graphs which depict the effect of a fumed silica and a copolymer constituent on yield stress; and, FIG. 10 is a graph which depicts the effect of varying amounts of a fumed silica and a copolymer constituent on a drip test.
Figure 9:
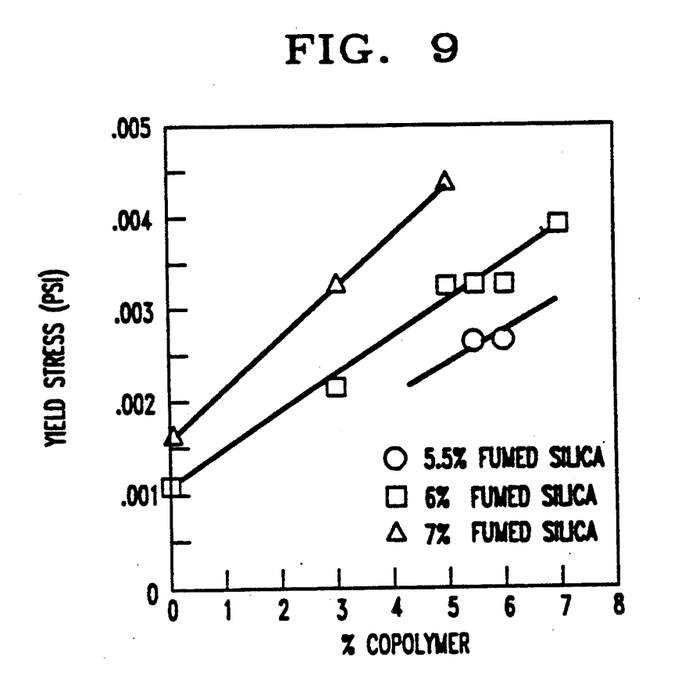

FIGS. 8 and 9 show the effect of Cab-O-Sil TS720 fumed silica and Kraton G 1701, copolymer on the yield stress of filling materials. From the slopes of the curves in FIGS. 8 and 9, it should be apparent that the effect of Cab-O-Sil fumed silica is greater than that of Kraton G1701 copolymer. For cables to pass a 65° C. no drip requirement, the yield stress of the filling material may, in most instances, be at least about 0.003 psi.

The composition of the filling material 26 unexpectedly results in excellent properties. It would be expected that to increase the drip temperature, the yield stress and hence the viscosity would have to be increased, perhaps to unacceptable levels. Unexpectedly, the filling material of cable of this invention provides excellent results notwithstanding its relatively low viscosity. The bleed inhibitor performs several functions; not only does it reduce oil separation, the bleed inhibitor also keeps the viscosity low and increases the yield stress but not as much as the fumed silica.

Also, it should be observed that the level of the antioxidant constituent is relatively high. This provides a reservoir of antioxidant which increases the oxidative stability of the tubular member 28 and optical fiber coatings to prevent premature degradation of the optical fiber cable.

The filling material 26 of this invention has enhanced performance at low temperature because of the use of a low pour point oil, has a relatively high cable drip temperature and very low oil separation. The filling material 26 is compatible with presently used fiber coating materials and other cable materials which it contacts. There is no bleeding of oil and it is expected that the optical loss at −40° C. will not exceed that of the prior art filling materials.

The test results show that a filling material made with an increase in fumed silica level in mineral oil, although reducing the oil separation and greatly increasing the viscosity, was still unable to pass the 65° C. cable drip test. Apparently, fumed silica as the only thickening agent in a mineral oil-based filling composition of matter cannot enable a cable to pass the drip test without an adverse viscosity increase. To avoid this result, a thermoplastic rubber is used in combination with fumed silica. Also interesting is that at the same fumed silica level, a higher viscosity mineral oil produced filling materials having a viscosity lower than those prepared by a lower viscosity mineral oil.

Figure 10:
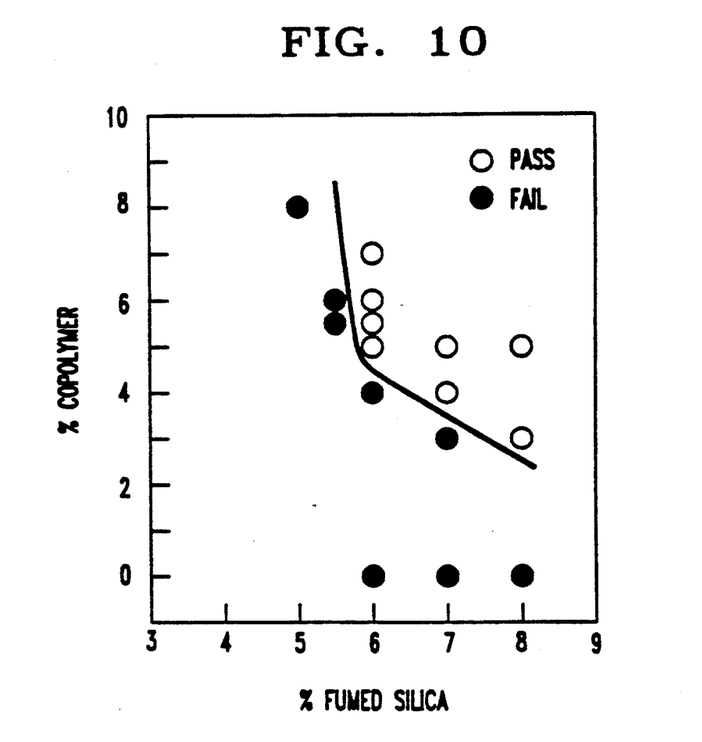

In FIG. 10 is shown the effect of Cab-O-Sil TS720 fumed silica and Kraton G 1701 copolymer on the drip test. The compositions on the left side of the curve passed the 65° C. drip test whereas those on the right failed.

As stated before, what had been sought after and what has been achieved is a filling material in which oil separation has been reduced, cable drip temperature has been increased, optical fiber coating swell has been reduced, in which low temperature optical loss has been reduced or maintained at current levels, and in which processing characteristics of the filling material disclosed in previously mentioned U.S. Pat. No. 4,701,016 were retained. The goal was to provide a filling material which has zero oil separation at 15,000 rpm for two hours using an IEC model centrifuge. The filling material of the preferred embodiment satisfies this requirement.

It is to be understood that the above-described arrangements are simply illustrative of the invention. Other arrangements may be devised by those skilled in the art which will embody the principles of the invention and fall within the spirit and scope thereof.

I claim:
1. An optical fiber cable, said optical fiber cable comprising:
   a core comprising at least one optical fiber transmission medium;
   a sheath system which is disposed about said core; and
   a filling composition of matter which is disposed in said core, said filling composition of matter com- prising at least about 85 percent by weight of an aliphatic hydrocarbon having a molecular weight of at least about 600, a thickening system which includes an inorganic constituent and a block copolymer and a relatively high amount of an antioxidant system.

2. The optical fiber cable of claim 1, wherein said relatively high molecular weight aliphatic hydrocarbon is selected from the group consisting of a synthetic oil, a relatively high molecular weight mineral oil and a mixture comprising a synthetic oil and a relatively high molecular weight mineral oil.

3. The optical fiber cable of claim 1, wherein said synthetic oil is selected from the group consisting of polyalphaolefin, a polybutene, and a polypropene.

4. The optical fiber cable of claim 1, wherein said inorganic thickening agent comprises a hydrophobic fumed silica.

5. The optical fiber cable of claim 1, wherein said block copolymer comprises a diblock copolymer comprising a polystyrene block and a poly (ethylene-propylene) block having a styrene-rubber ratio in the range of about 0.39 to 0.59.

6. The optical fiber cable of claim 1, wherein said block copolymer comprises a mixture of a 30% triblock copolymer and 70% of a diblock copolymer.

7. The optical fiber cable of claim 1, wherein said block copolymer comprises a diblock copolymer of ethylene and propylene.

8. The optical fiber cable of claim 1, wherein said antioxidant system comprises a high molecular weight, hindered phenolic antioxidant which is relatively soluble in mineral oil.

9. The optical fiber cable of claim 1, wherein said antioxidant system comprises a high molecular weight, hindered phenolic antioxidant which is nonprecipitating in the filling composition of matter.

10. A composition of matter which is suitable for filling optical fiber cables, said composition including:

at least 85 percent by weight of an aliphatic hydrocarbon constituent having a molecular weight of at least about 600;

an inorganic thickening agent;

a block copolymer; and a relatively high amount of antioxidant system.

11. The composition of matter of claim 10, wherein said relatively high molecular weight aliphatic hydrocarbon constituent is selected from the group consisting of polyalphaolefin, a polybutene, a polypropene and a relatively high molecular weight mineral oil.

12. The composition of matter of claim 10, wherein said composition includes an inorganic thickening agent and an organic thickening agent.

13. The composition of matter of claim 12, wherein said inorganic thickening agent comprises a hydrophobic fumed silica.

14. The composition of matter of claim 10, wherein said block copolymer comprises a diblock copolymer comprising a polystyrene block and a poly (ethylene-propylene) block having a styrene-rubber ratio in the range of about 0.39 to about 0.59.

15. The composition of matter of claim 10, wherein said block copolymer comprises a mixture of 30% of a styrene-ethylene-butylene-styrene block copolymer and 70% of a polystyrene and polyethylene butylene diblock copolymer.

16. The composition of matter of claim 10, wherein said block copolymer comprises a diblock copolymer of ethylene and propylene.

17. The composition of matter of claim 10, wherein said antioxidant system comprises a high molecular weight, hindered phenolic antioxidant which is relatively soluble in mineral oil.

18. The composition of matter of claim 10, wherein said antioxidant system comprises a high molecular weight, hindered phenolic antioxidant which is nonprecipitating in the filling composition.

* * * * *